UNITED STATES PATENT OFFICE.

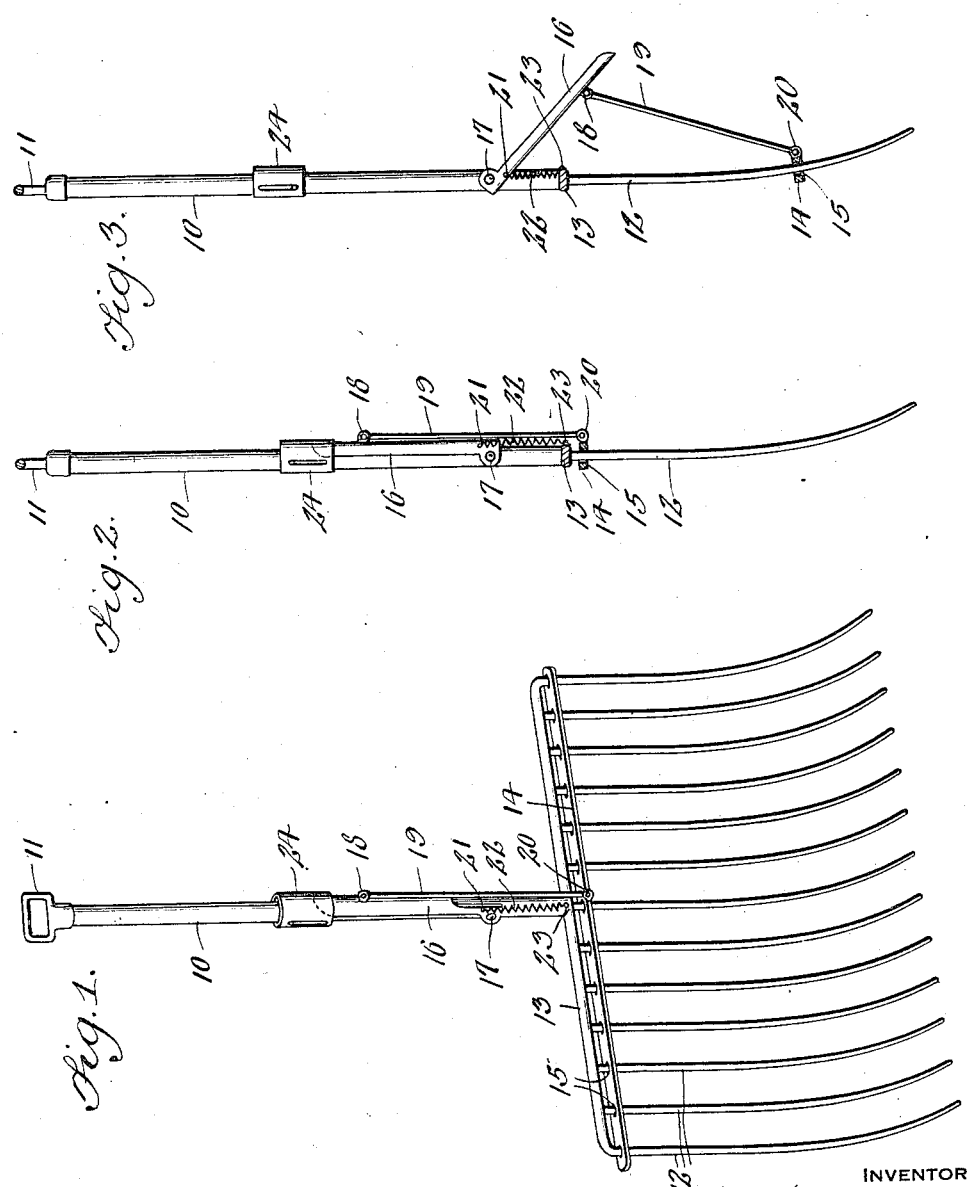

LESLIE R. CORNWELL, OF DALLAS, IOWA.

ENSILAGE-FORK.

1,266,411.  Specification of Letters Patent.  Patented May 14, 1918.

Application filed July 18, 1917. Serial No. 181,339.

*To all whom it may concern:*

Be it known that I, LESLIE R. CORNWELL, a citizen of the United States, residing at Dallas, in the county of Marion and State of Iowa, have invented new and useful Improvements in Ensilage-Forks, of which the following is a specification.

This invention relates to forks especially used in handling ensilage or similar material and aims to provide means for cleaning the tines of the fork to facilitate the use of the same.

The object of the invention is to provide a tine cleaning bar which is mounted for movement over the tines of the fork with connected means carried by the fork handle, the said means being normally retained inactive and the spring tensioned, so that when the connecting means is released the spring will force the clearing bar along the tines and thoroughly remove therefrom stalks or cobs usually contained in ensilage.

The invention therefore consists of the following novel combination and arrangement of parts, hereinafter more fully described and illustrated in the accompanying drawings, in which—

Figure 1 is a perspective view of a fork embodying the present invention;

Fig. 2 is a vertical sectional view of the same, showing the cleaning bar in an operative position; and Fig. 3 is a similar view showing the bar positioned near the outer ends of the tines.

Referring to the drawings in detail, there is illustrated a fork especially designed for use in handling ensilage and embodying a handle 10, provided with a hand grip 11 of any approved form. The handle 10 has secured thereto by any desired means, the usual tines 12, which are connected at their inner ends by means of a transverse bar 13, the construction and arrangement of the tines being varied to suit the requirements of the fork.

A bar 14, herein designated as a clearing bar, is formed with a plurality of spaced openings 15, which are adapted to receive the tines 12 of the fork, the said openings being of sufficient size to permit a free movement of the bar along the tines.

Mounted upon the handle 10 of the fork is a lever 16, which is pivoted to the fork as shown at 17, the said lever having connected thereto a shank 18, upon one end of a rod 19. The opposite end of this rod 19 is pivotally connected with the clearing bar 14 as shown at 20, so that a movement of the lever 16 will cause the bar 14 to be moved longitudinally of the tines 12.

Secured to the lever 16, as shown at 21, is one end of a retractile spring 22, the opposite end of this spring being connected as shown at 23 with a transverse bar 13, the said spring serving to force the bar 14 toward the outer free ends of the tines 12.

In order to normally retain the bar 14 at the inner ends of the tines and against the transverse bar 13, there is provided a securing element 24, which may be in the form of a hook or loop, or may consist of any desired means which will effectually hold the lever in its normal position and against accidental movement.

When it is desired to clean the tines, the element 24 is moved to release the lever 16, the spring serving to suddenly move the clearing bar 14 along the tines and to remove therefrom any objections which may be located thereon.

It is believed that from the foregoing description when taken in connection with the accompanying drawings, the construction, operation and advantages of the invention will be apparent. The right is reserved to make such changes in the form and proportion thereof as will fall within the scope of the claim hereto appended.

Having described the invention, what is claimed is:

In a fork, the combination with a handle, tines thereon, said tines lying substantially in the same plane as the handle of a perforated bar mounted for movement along said tines, said tines passing through said perforations, a lever having one end pivotally connected to the handle of said fork adjacent the tines, a rod having one end pivotally connected with the opposite end of said lever, the opposite end of the rod being pivotally connected to the perforated bar intermediate the ends of the bar, a spring having one end secured to the fork handle and the opposite end secured to the lever for forcing said lever downward toward the free ends of the tines and a locking sleeve mounted for limited sliding movement along said handle and engageable with the free end of said bar for holding the bar against such movement.

In testimony whereof I affix my signature.

LESLIE R. CORNWELL.

Copies of this patent may be obtained for five cents each, by addressing the "Commissioner of Patents, Washington, D. C."